Patented Nov. 6, 1945

2,388,390

UNITED STATES PATENT OFFICE 2,388,390

DESICCATING AGENT

Stanley V. Cook, Dayton, and Charles E. Waring, Oakwood, Ohio, assignors to General Motors Corporation, Dayton, Ohio, a corporation of Delaware No Drawing. Application June 1, 1943, Serial No. 489,272

3 Claims. (Cl. 252—194)

This invention relates to desiccating agents and the process of treating the same. More particularly this invention relates to a desiccant package for use in removing moisture from refrigerating apparatus, electrical apparatus, optical apparatus or the like.

There are many systems, of which a refrigerating system is typical, in which the presence of moisture and other foreign matter is objectionable. While there are many desiccant materials which have been used for removing moisture from various types of apparatus, the most satisfactory desiccant materials are difficult to handle or are objectionable from the standpoint that they release fine particles of dust. In many such systems the presence of dust or fine powder is especially objectionable.

It is an object of our invention to coat the desiccant material with a moisture permeable membrane which allows moisture to penetrate therethrough to the desiccant material but prevents any of the desiccant material even in dust form from escaping through the membrane.

A further object of this invention is to provide a desiccant material with a moisture permeable membrane which is inexpensive and which is easy to apply to the desiccant material.

A further object of this invention is to apply a moisture permeable plastic to a granular desiccant material so as to bond the grains of desiccant material together into a coherent mass.

Another object of this invention is to provide a porous coherent mass of desiccant material.

Further objects and advantages of the present invention will be apparent from the following description.

The material which we prefer to use as the desiccant material is anhydrous calcium sulphate, although other materials such as lime or other alkaline earth oxides may also be used. The coating material which we prefer to use is cellulose acetate although other materials such as ethyl cellulose, methyl cellulose, or any of the hygroscopic coatings of cellulose esters or ethers may be used, depending upon the particular application. Thus in a refrigerating system employing Freon refrigerants we prefer to use anhydrous calcium sulphate granules coated with cellulose acetate so as to completely enclose the anhydrous calcium sulphate whereby fine particles of calcium sulphate are prevented from passing through the coating.

One advantage of this combination of materials is that the final product is a substantially rigid coherent mass which may be handled without danger of dusting, chipping or breaking. It is important that the coating material be a moisture permeable material which will allow the moisture to pass therethrough and be picked up by the desiccant material. In coating the desiccant material with cellulose acetate, cellulose acetate is dissolved in acetone so as to give a 15% solution and this solution is applied directly to the desiccant material which may be either in the form of large lumps, small grains approximately the size of rice grains, or it may be in the form of powder. The size of the particles of the desiccant material will depend largely upon the use to which the material is put. Thus in the ordinary refrigerant system granular material in which the grains are approximately the size of rice grains are very satisfactory. The mixture of desiccant material and cellulose acetate may be molded into any desired shape such as a stick to be placed in a refrigerant line, a wafer, a pellet or any other shape. The outer surface of the molded element may be sprayed or otherwise coated with cellulose acetate if desired.

If desired powdered calcium sulphate thoroughly mixed with a substantially equal amount of ground cellulose acetate may be molded by the application of heat and pressure. The outer surface of the material molded in this manner would preferably be coated with a solution of cellulose acetate.

While the form of embodiment of the invention as herein disclosed constitutes a preferred form, it is to be understood that other forms might be adopted, as may come within the scope of the claims which follow.

What is claimed is as follows:

1. A desiccant comprising in combination, substantially anhydrous calcium sulphate and a coating therefor comprising a quantity of cellulose acetate sufficient to prevent dusting.

2. A desiccant comprising in combination, substantially anhydrous calcium sulphate particles and a coating for the individual particles comprising a moisture permeable, moisture insoluble but dust proof material.

3. A desiccant comprising in combination, a granular desiccant material and a coating therefor comprising a quantity of cellulose acetate sufficient to prevent dusting of the granular material.

STANLEY V. COOK.
CHARLES E. WARING.